United States Patent [19]
Borg et al.

[11] Patent Number: 5,669,066
[45] Date of Patent: Sep. 16, 1997

[54] DYNAMIC CONTROL OF TRANSMITTING POWER AT A TRANSMITTER AND ATTENUATION AT A RECEIVER

[75] Inventors: Lars Uno Borg, Stockholm; Lars Magnus Lindroth, Täby, both of Sweden

[73] Assignee: Telefonaktiebolaget LM Ericsson, Stockholm, Sweden

[21] Appl. No.: 61,043

[22] Filed: May 14, 1993

[51] Int. Cl.$^6$ ................................................. H04B 1/00
[52] U.S. Cl. ........................ 455/69; 455/132; 455/226.2; 455/232.1
[58] Field of Search ................................. 455/69, 68, 70, 455/63, 115, 116, 126, 127, 226.1, 226.2, 232.1, 132, 140, 54.1, 54.2, 56.1, 33.1, 88

[56] References Cited

U.S. PATENT DOCUMENTS

| | | | |
|---|---|---|---|
| 2,543,973 | 3/1951 | Jensen | 455/140 |
| 3,139,584 | 6/1964 | Fredrickson . | |
| 3,143,706 | 8/1964 | Michael . | |
| 3,577,103 | 5/1971 | Sparks . | |
| 4,119,972 | 10/1978 | Fletcher et al. | 343/844 |
| 4,393,513 | 7/1983 | Yokogawa et al. . | |
| 4,531,234 | 7/1985 | Bell . | |
| 4,607,215 | 8/1986 | Takano et al. . | |
| 4,613,990 | 9/1986 | Halpern . | |
| 4,661,993 | 4/1987 | Leland et al. . | |
| 4,739,516 | 4/1988 | Starkloff et al. . | |
| 4,777,653 | 10/1988 | Bonnerot et al. | 455/69 |
| 4,843,637 | 6/1989 | Shimura et al. . | |
| 5,086,508 | 2/1992 | Furuno . | |

FOREIGN PATENT DOCUMENTS

| | | | |
|---|---|---|---|
| 1339102 | 11/1991 | Japan | 455/69 |

OTHER PUBLICATIONS

Patent Abstracts of Japan, vol. 16, No. 45, E–1162, abstract of Japanese patent document JP, A, 3–248634, published on Nov. 6, 1991.
PCT International Search Report mailed on Aug. 31, 1994 in connection with a counterpart International Application No. PCT/SE 94/00435.

*Primary Examiner*—Reinhard J. Eisenzopf
*Assistant Examiner*—Doris To
*Attorney, Agent, or Firm*—Burns, Doane, Swecker & Mathis, L.L.P.

[57] ABSTRACT

A communications system includes a receiver and a transmitter for transmitting a communications signal to the receiver. The transmitter adjusts its transmission power level in response to receiver power control signals transmitted by the receiver. The receiver includes an attenuator for attenuating the received communications signal, and measurement circuitry for measuring the signal strength of the attenuated signal. The measured signal strength is coupled to an attenuator controller and to a transmission power controller. The attenuator controller and the transmission controller adjust, respectively, receiver attenuation and transmitter power level so as to optimize system performance. This may include keeping the attenuated signal within the dynamic range of the receiver. This may also include eliminating disturbance signals by adjusting receiver attenuation to produce an effective dynamic range for receiving only signals having a signal strength level that is higher than the disturbance signal strength level, while at the same time increasing the transmission power level to keep it within the effective dynamic range of the receiver. The disturbance signal may be detected as an increased bit error rate of the received communication signal. The apparatus and method may also be applied to systems in which a plurality of receivers are coupled to a common antenna through a receiver multicoupler.

19 Claims, 6 Drawing Sheets

DYNAMIC CONTROL OF TRANSMITTING POWER AT A TRANSMITTER AND ATTENUATION AT A RECEIVER

BACKGROUND

Applicants' invention relates to communications systems including transmitters and receivers, and more particularly to a communications system that optimizes performance by dynamically adjusting transmitter power and receiver attenuation.

In a typical telecommunications system, such as in a cellular telephone system, a receiver is designed to function with signals in a given signal strength range. This signal strength range is referred to as the dynamic range of the receiver. The lowest acceptable signal strength that can be received is called the receiver sensitivity. The highest acceptable signal strength that can be received is called the blocking limit.

In a cellular telephone system, the distance between a base station (BS) and a mobile station (MS) varies as the mobile station moves around within a cell. Consequently, in large cells, the variations in received signal strength can be very large. Sometimes, these variations are so large that they cannot be compensated by varying the mobile station's transmit power. In such cells, it would be useful for the receiver dynamic range, that is, the signal level range defined by the highest and lowest acceptable received signal levels, to be changed/transposed in relation to the distance between the base station and the mobile station.

Figure 1:
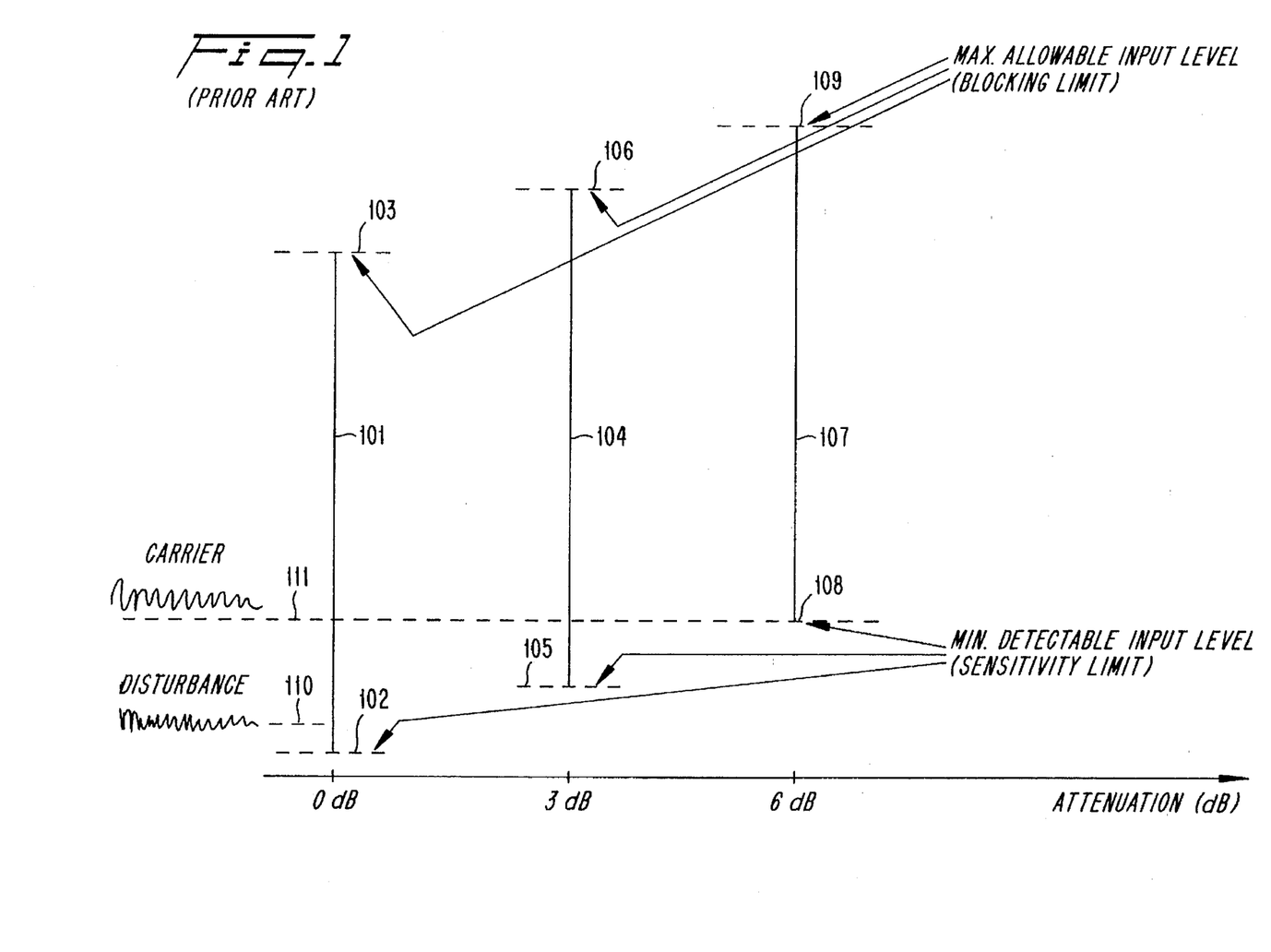
FIG. 1 is a graph showing the dynamic range of a receiver as a function of attenuation.

The receiver dynamic range may be transposed by placing an attenuator between the antenna and the receiver. As attenuation increases, both the lowest and highest acceptable received signal strengths increase. Similarly, the receiver dynamic range is transposed downward as attenuation decreases. This influence of attenuation on dynamic range is illustrated in FIG. 1. When attenuation is set at 0 decibels (dB), the receiver dynamic range 101 is defined by the sensitivity 102 and the blocking limit 103 of the receiver (not shown).

If attenuation is increased to 3 dB, the receiver dynamic range shifts to a new dynamic range 104, defined by sensitivity 105 and blocking limit 106, both of which are substantially 3 dB higher than the respective sensitivity 102 and blocking limit 103 that existed when attenuation is only 0 dB. Similarly, if attenuation is increased to 6 dB, the sensitivity 108 and blocking limit 109 are again increased, yielding a new receiver dynamic range 107.

In small cells, the distance between a mobile station and a base station can be very small. This can lead to disturbances in the receive band if there are large cells in the same area as the small cell. These large cells may belong to the same network as the small cell, or they may belong to another network operating in the same or an adjacent frequency band. The measure of these disturbances can be a bit error rate in digital communications systems. In analog systems, other signal quality measures can be used, such as total distortion of a modulated pilot tone.

Figure 2:
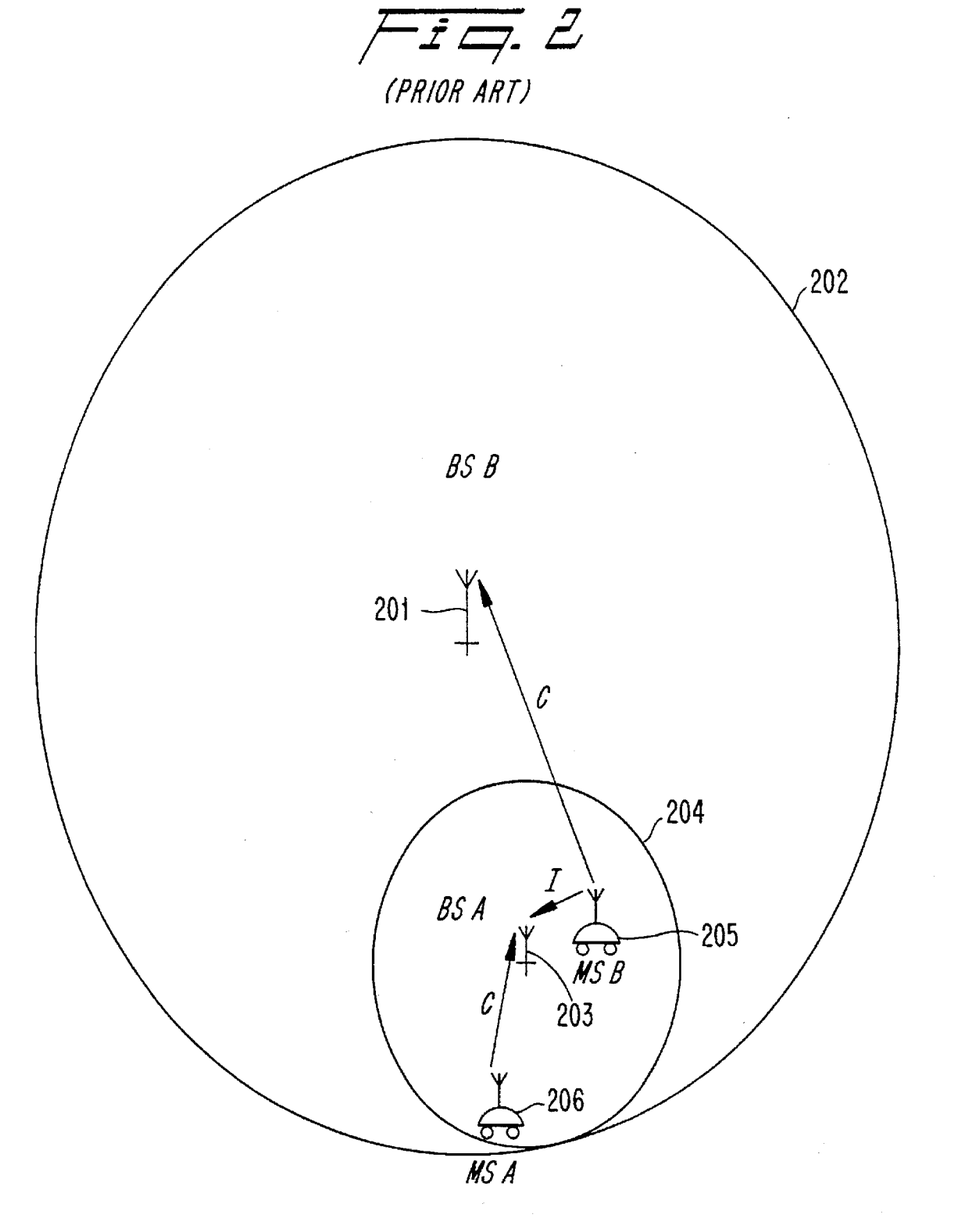
FIG. 2 illustrates the situation of having a small mobile communications cell at least partly located within a large mobile communications cell.

The situation just described is illustrated in FIG. 2, in which a base station B 201 is associated with a cell 202, and a base station A 203 is associated with a cell 204. It will be observed that cell 204 is smaller than cell 202, and defines a geographical area that is located inside or near cell 202. Thus, because of the difference in the cells' relative sizes with respect to one another, cell 202 may be called a "macrocell" and cell 204 may be called a "microcell". When a mobile station B 205, associated with the "macrocell" 202 comes near base station A 203, the base station A 203 receiver may experience disturbances from mobile station B 205. This may be so even if the radio frequencies used by base station A 203 are widely separated from those used by base station B 201 and mobile station B 205.

If base station A 203 is equipped with a dynamically adjustable attenuator interposed between the antenna and receiver as described above, the attenuation can be increased until the disturbance experienced by the receiver is acceptably low. This is because the disturbances in the receive band are attenuated with at least the value of the attenuator. However, the desired signal from mobile station A 206, which is transmitting to base station A 203, is also attenuated with the value of the attenuator. This may cause the signal from mobile station A 206 to be unacceptably low for reception by base station A 203.

SUMMARY

The above-described problem, and others, are solved in accordance with the Applicants' invention by dynamically controlling both the attenuation at the base station A 203 receiver, and the transmit power of the mobile station A 206.

In one aspect, Applicants' invention provides a receiver that receives a communications signal from a transmitter, the received communications signal being attenuated at the receiver. The signal strength of the signal is then measured. This measured signal strength is then applied to a means for controlling the attenuation and to a means for controlling the transmission power. The attenuation control means dynamically controls the mount by which the received signal is attenuated.

The transmission power control means generates a power control signal to be communicated to the transmitter. The transmitter uses the received power control signal to adjust the power level at which it transmits the communications signal to the receiver. Both the attenuation control means and the transmission control means control, respectively, receiver attenuation and transmission power level so as to optimize system performance.

In another aspect of the invention, receiver attenuation and transmission power level are adjusted to keep the attenuated signal within the dynamic range of the receiver. This feature is useful, for example, for designing a less expensive receiver having a reduced dynamic range which is compensated for by appropriate adjustment of receiver attenuation and transmission power level.

In still another aspect of the invention, receiver attenuation is adjusted so that the receiver sensitivity level is relatively high compared to a disturbance signal level, while at the same time transmission power level is adjusted so that the communications signal coming through the attenuator is still within the dynamic range of the receiver.

In yet another aspect of the invention, the attenuator may include an antenna having a dynamically adjustable gain.

In still another aspect of the invention, dynamic adjustment of receiver attenuation and transmission power level are applied to a system in which a plurality of receivers are coupled to a common antenna through a multicoupler. In one embodiment, a common attenuator is interposed between the common antenna and the multicoupler. In another embodiment, each receiver is also capable of further attenuating its received communications signal.

BRIEF DESCRIPTION OF THE DRAWINGS

These and other aspects of the invention will become apparent from the following description read in conjunction with the accompanying drawings in which.

DETAILED DESCRIPTION

Figure 3:
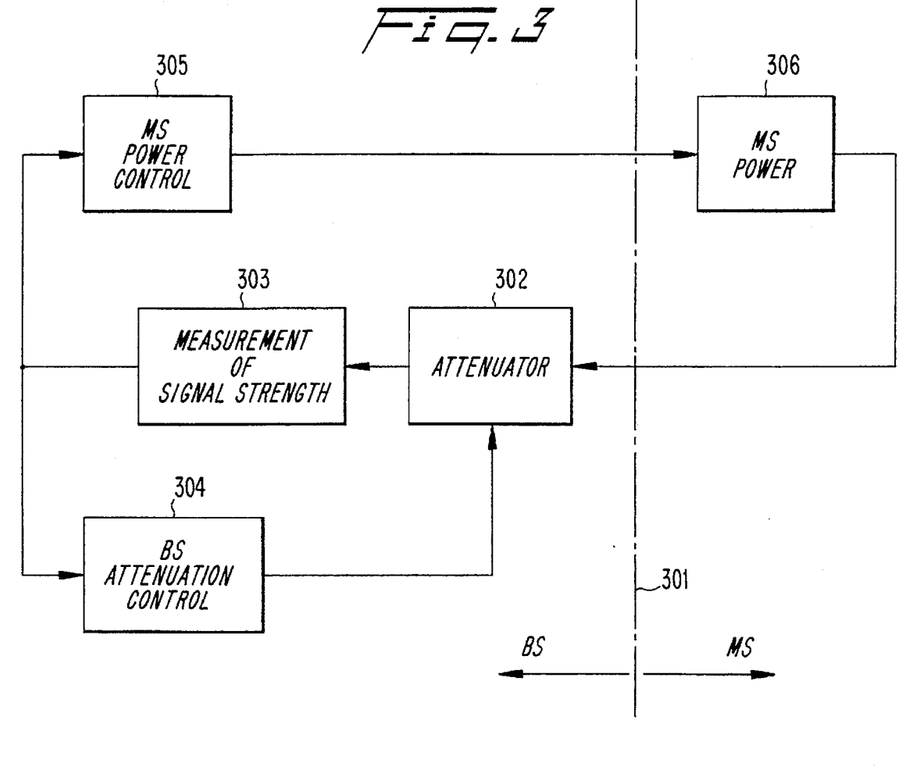
FIG. 3 is a block diagram of an apparatus in accordance with the present invention for dynamically controlling receiver attenuation and transmitter power.

Referring now to FIG. 3, a mobile telecommunications system incorporating the present invention is illustrated. Blocks to the fight of the dotted line 301 are located in a mobile station. Blocks to the left of the dotted line 301 are located in a base station.

Signals received at the base station by means of an antenna (not shown) are input to a dynamically adjustable attenuator 302. The signal that is output from the attenuator 302 is input to a signal strength measurement circuit 303. The output of the signal strength measurement circuit 303 is coupled to the inputs of an attenuation control circuit 304, and to a mobile station power control circuit 305. The attenuation control circuit 304 is coupled to the attenuator 302 in order to control the mount of signal attenuation that occurs. The mobile station power control circuit 305 uses the output of the signal strength measurement circuit 303 in order to generate a signal that is communicated to a mobile station power circuit 306, where it controls the transmit power level of the mobile station. In one preferred embodiment of the invention, the signal strength measurements and power control functions are made in accordance with the European Telecommunications Standards Institute's (ETSI) Global System for Mobile Communications (GSM) standards, which are herein incorporated by reference. In particular, GSM recommendation 05.08 describes signal strength measurement in Sections 8.1.2 and 8.1.3. Sections 3.2–4.7, in conjunction with GSM recommendation 05.05 Section 4.1, describe RF power control. In this way it will be seen that a signal strength measurement is made on the basis of the received communications signal. The control functions of the attenuation control circuit 304 and the mobile station power control circuit 305 are described in more detail below.

One use of the dynamic control system depicted in FIG. 3 is to compensate for the varying signal strength received by a base station B 201 (see FIG. 2) that occurs when a mobile station B 205 travels within a large cell 202. If the transmit power of the mobile station B 205 is constant, the signal strength received by the base station B 201 decreases as the distance between the mobile station B 205 and the base station B 201 increases. Conversely, as the mobile station B 205 comes closer to the base station B 201, the received signal strength increases, assuming again that the transmit power of the mobile station 205 is constant.

The present invention compensates for this as follows. When the mobile station B 205 is situated near the border of the cell 202, the mobile station power control circuit 305 detects the diminution in received signal strength, and transmits a signal ordering the mobile station B 205 to transmit at a high power level. Due to the large path loss that occurs over this distance, the received signal strength in the base station B 201 may still be weak, and may be close to the receiver sensitivity level.

When the mobile station B 205 moves towards the base station B 201, the received signal strength in the base station B 201 increases. This is detected by the mobile station power control circuit 305, which responds by transmitting a signal to the mobile station B 205 which causes it to reduce its transmit power to a level that keeps the received signal strength within the receiver dynamic range. At some point, as the mobile station B 205 travels towards the base station B 201, the mobile station B 205 is transmitting at its lowest possible power level. As the mobile station B 205 continues towards the base station B 201, the received signal strength will increase, and after some time may be higher than is acceptable. In other words, despite the fact that the mobile station B 205 is transmitting at its lowest possible power level, its proximity to the base station B 201 causes the received signal strength to exceed the blocking limit of the receiver.

This problem is solved in the present invention by the attenuation control circuit 304, which detects the unacceptably high received signal strength, and orders the attenuator 302 to increase the amount of attenuation. The upper limit of the acceptable signal strength (i.e., the blocking limit) will then increase, thereby eliminating the problem with the high received signal strength.

Another problem that is solved by the present invention is the above-described situation that can occur when a small cell 204 is located inside, or near, a large cell 202. As explained above, the disturbance in a base station A 203 caused by a mobile station B 205 that is attempting to transmit to a base station B 201 may be high, relative to the wanted signal being transmitted by the mobile station A 206.

In accordance with the present invention, the mobile station power control circuit 305 detects the high level of disturbance, recognizable in digital communications systems, for example, as an increase in the bit error rate for the channel (i.e., the present value of the bit error rate is now higher than a predetermined value of the bit error rate), and causes action as follows. The attenuation control circuit 304 causes the attenuator 302 to increase its attenuation until the signal strength of the disturbance 110 (see FIG. 1) is considerably reduced, possibly below the receiver sensitivity level 105. However, the desired carrier signal is also attenuated by this action. To compensate for this, the mobile station power control circuit 305 transmits a signal to the power control circuit 306 of mobile station A 205, causing it to increase its transmit power level until the received signal strength of the carrier signal 111 (see FIG. 1) is above the receiver sensitivity level 105. Thus, the received signal strength of the desired signal is kept constant above the sensitivity level while the disturbance is suppressed.

It will be recognized by those skilled in the art that, in the above scenario, the mobile station power control 395 could have been the first to act by ordering the mobile station A 206 to increase its transmit power level in order to increase the received signal strength accordingly, and thereby reduce the bit error rate. The attenuation control circuit 304 could then respond to this occurrence by increasing attenuation of the received signal to bring the received signal strength back down to a desired level.

In another feature of the invention, dynamic attenuation under the control of the attenuation control circuit 304 is combined with a mobile station power control process, carried out by the mobile station power control circuit 305, in which signal quality of the received signal is used to determine the transmit power. By combining dynamic attenuation control with this kind of power control, unnecessary attenuation of the wanted signal is prevented when the disturbance is low. This has the advantage of keeping the mobile transmit power to a minimum, which is of great importance for many mobile applications. In one preferred embodiment, the mobile station power control process, in which signal quality of the received signal is used to determine the transmit power, is that which is described in copending U.S. patent application Ser. No. 08/061,00 entitled METHOD AND APPARATUS FOR TRANSMISSION POWER REGULATION IN A RADIO SYSTEM, filed in the name of Almgren et al. on May 14, 1993 and assigned to the assignee of this invention, the entire disclosure of which is hereby incorporated by reference.

Frequently, a base station has several receivers coupled to the same receiver antenna. In such situations, the attenuation must be partitioned accordingly. Another embodiment of the invention that solves this problem will now be described with reference to FIGS. 4 and 5.

Figure 4:
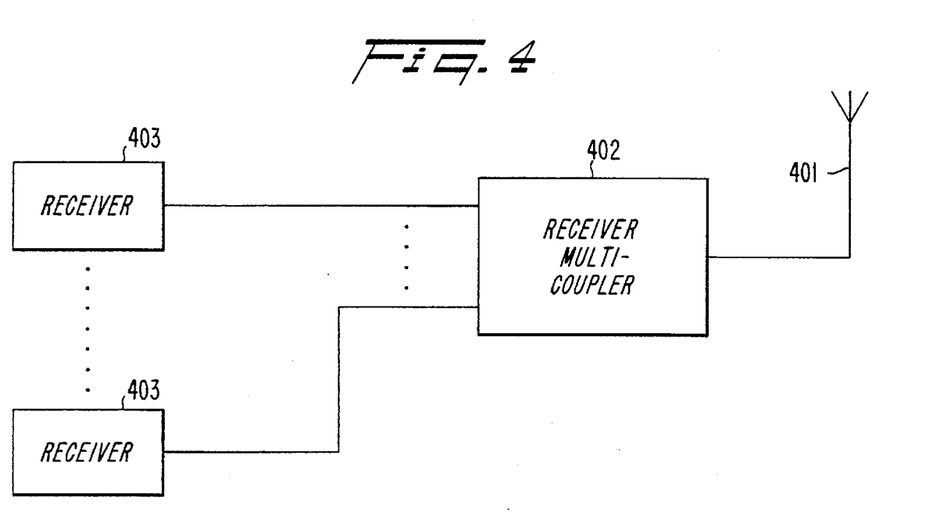
FIG. 4 is a block diagram of several receivers coupled to one antenna in accordance with another embodiment of the invention.

In FIG. 4, a number of receivers 403 are shown coupled to a single antenna 401 by means of a receiver multicoupler 402. The receiver multicoupler 402 is a wideband amplifier that receives a broad band signal and has a plurality of narrow band signal outputs. Each receiver 403 may include the invention as described above with reference to FIG. 3. However, the receiver multicoupler 402 may, itself, suffer blocking by strong signals that are input from the antenna 401. In that case, it is apparent that any attenuation that occurs within individual receivers 403 will be unable to eliminate this blocking. To avoid this problem, the receiver multicoupler 402 may be designed to have a higher blocking limit than any of the individual receivers 403.

Figure 5:
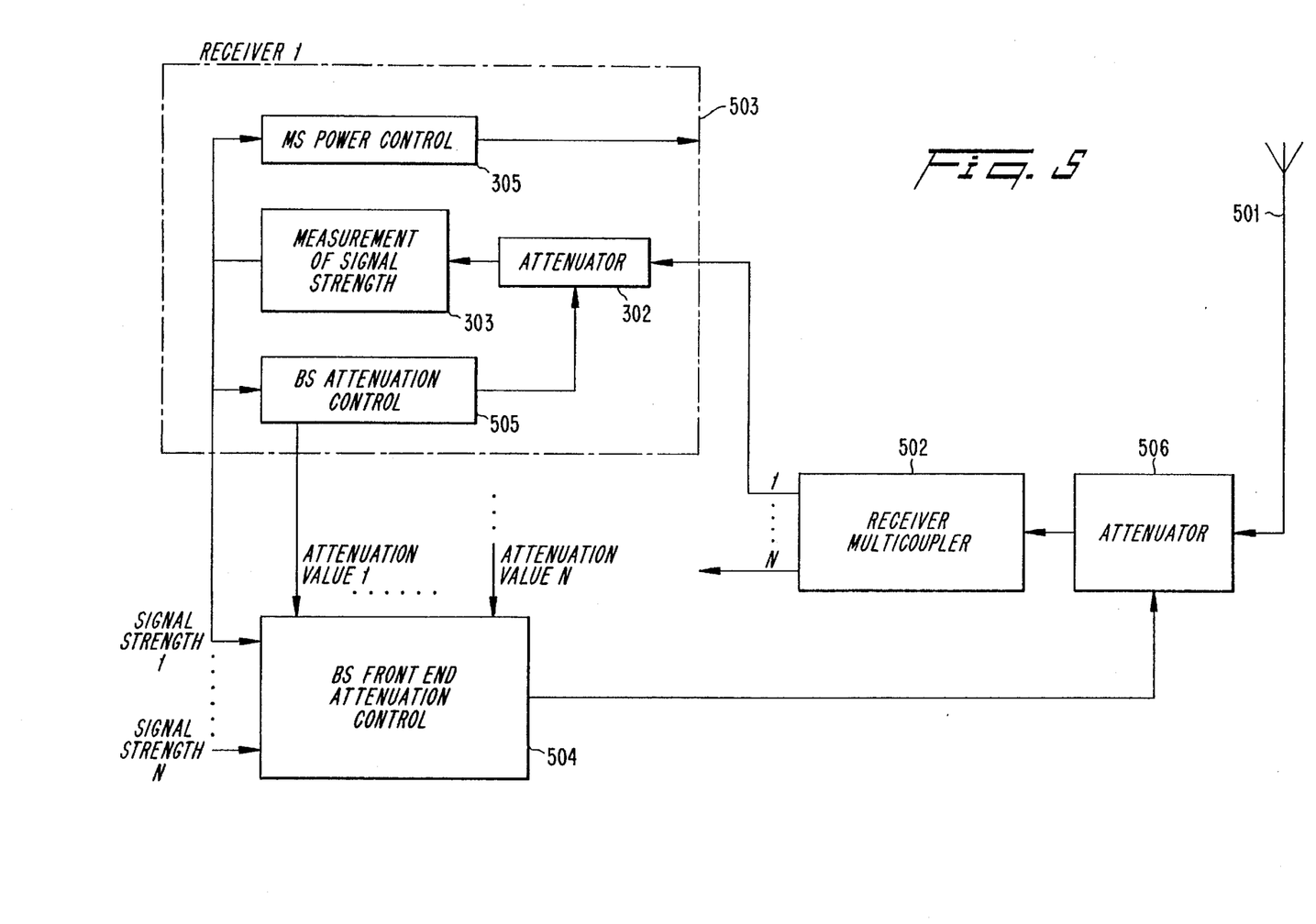
FIG. 5 is a block diagram of another embodiment of the invention which uses partitioned attenuation in a system having multiple receivers coupled to a common antenna by means of a multicoupler.

Another solution to the problem of blocking in the receiver multicoupler 402 is shown in FIG. 5. Here, attenuation is partitioned in order to achieve an optimum selection of attenuation before and after the receiver multicoupler 402.

One of a number N of receivers 503 is shown in FIG. 5. Although the following description makes reference only to a single receiver 503, it should be understood that the description is applicable to each of the N receivers 503. Each receiver 503 has the control circuitry as described above with reference to FIG. 3. In addition, the output of the signal strength measurement circuit 303 from each receiver 503 is coupled to an input of a base station front end attenuation control circuit 504.

A signal representing the amount of attenuation being utilized by the respective receiver 503 is also output from the receiver's base station attenuation control circuit 505 and coupled to an input of the base station front end attenuation control circuit 504. The base station front end attenuation control circuit 504 combines these inputs with corresponding inputs from the other receivers 503 to determine the true signal strength of the signal that is being output from the front end attenuator 506. For example, these input signals to the base station front end attenuation control circuit 504 may simply be averaged. Other methods of determining the true signal strength of the signal that is being output from the front end attenuator 506 may also be used.

The base station front end attenuation control circuit 504 then adjusts, by means of an output signal that is coupled to the front end attenuator 506, the strength of the signal that is input to the receiver multicoupler 502. The adjustment is such that the front end attenuation is kept as low as possible while still preventing blocking in the receiver multicoupler 502. It will be recognized that in order to make this adjustment, the base station front end attenuation control circuit 504 must also have information regarding the dynamic range of the receiver multicoupler 502. The information pertaining to the dynamic range of the receiver multicoupler 502 should preferably be preprogrammed in the base station front end attenuation control circuit 504.

The rest of the regulation is accomplished as described above with reference to FIG. 3. That is, each individual base station-mobile station link is regulated so as to produce an optimum balance of transmitted power and received signal quality.

Figure 6:
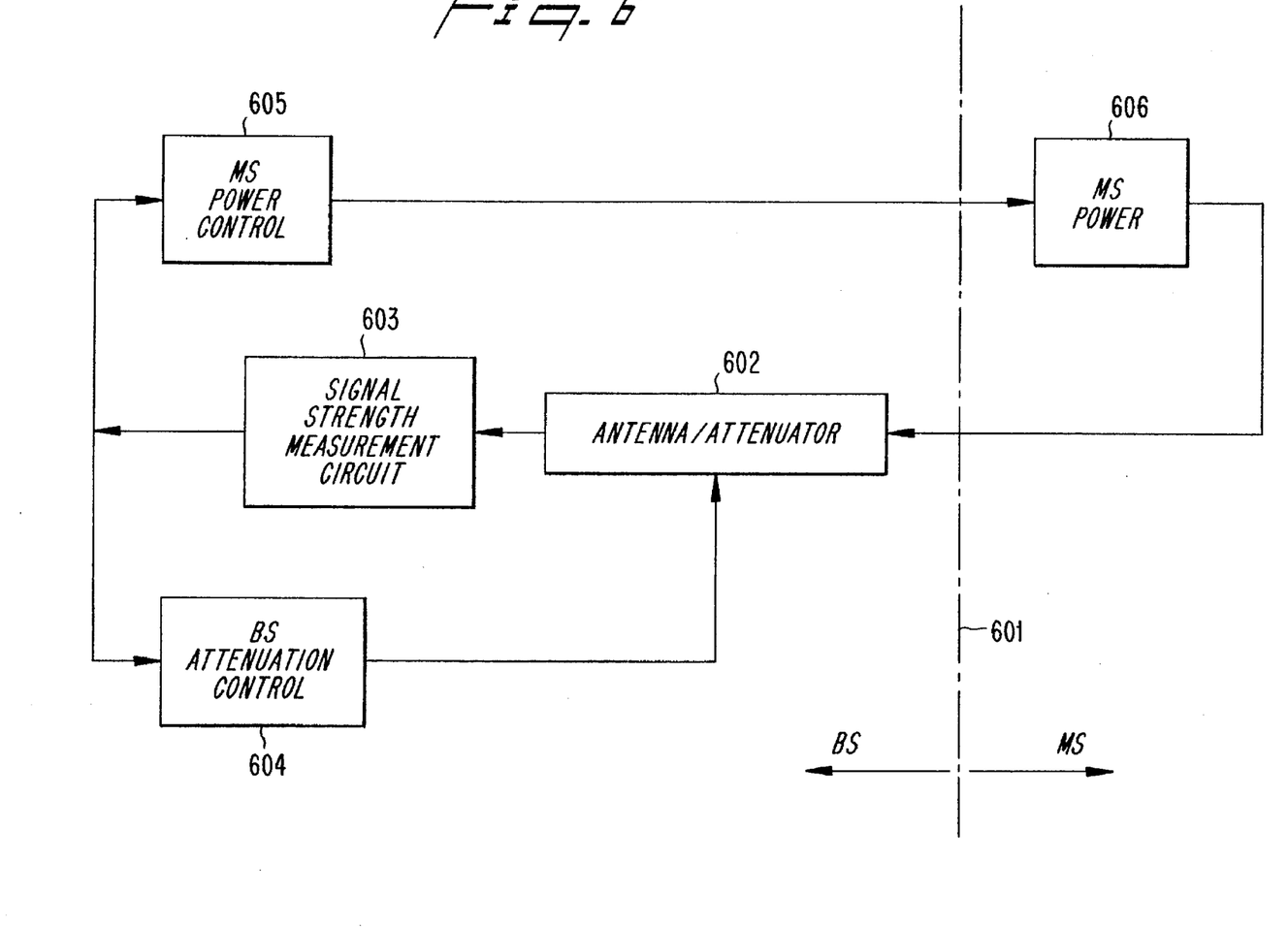
FIG. 6 is a block diagram of an alternative embodiment of the invention in which an antenna and a variable attenuator have been combined in a common element.

Referring now to FIG. 6, an alternative embodiment of the invention is shown. This embodiment is very much like the one shown in FIG. 3. The difference between the two embodiments is that, in FIG. 6, the variable attenuator has been replaced by the antenna/attenuator 602, which is an antenna having adjustable antenna gain, such as an electronically adjustable phased array antenna. The remaining elements in FIG. 6 operate the same as the corresponding elements described above with respect to FIG. 3, and need not be described in further detail.

Figure 7:
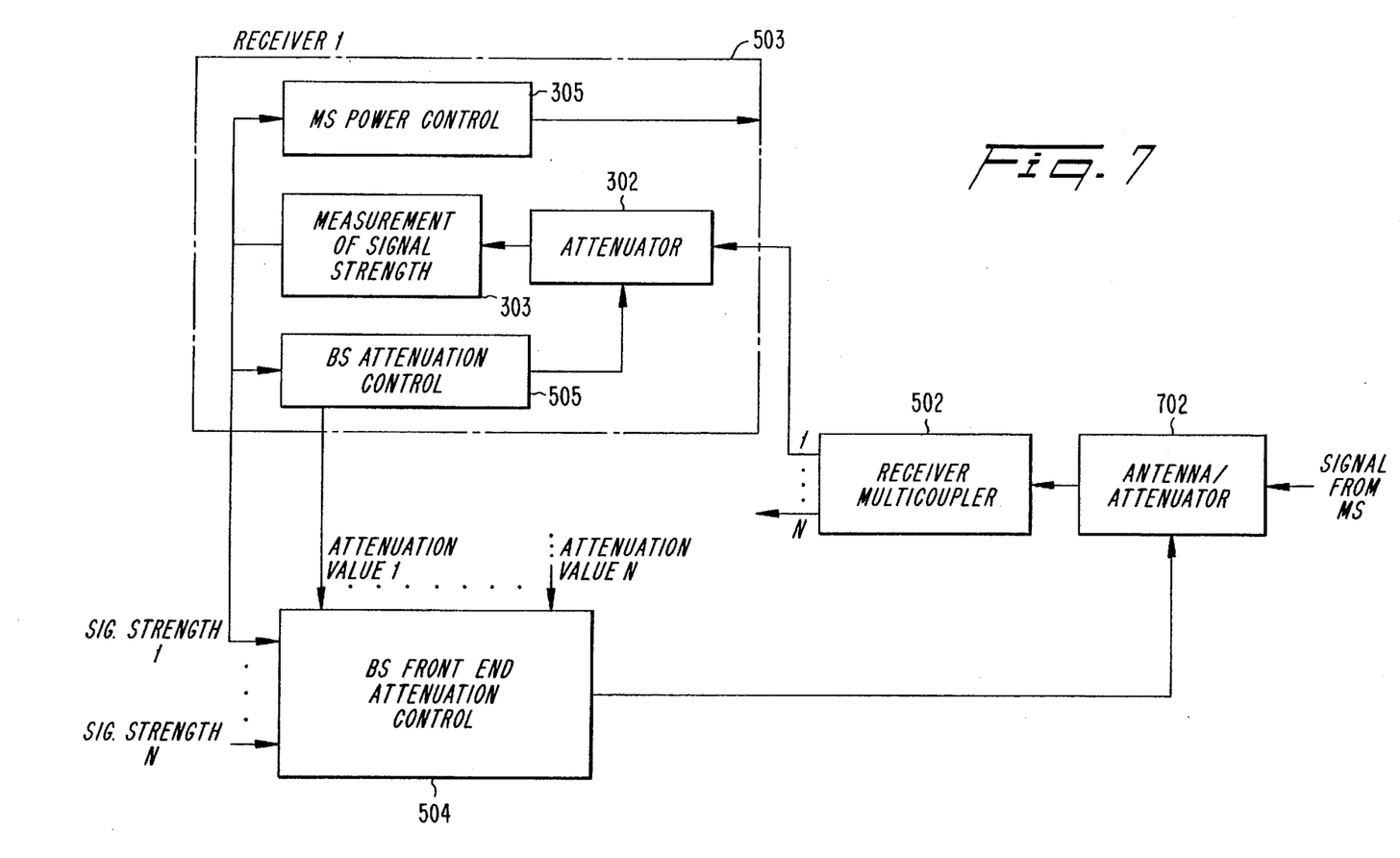
FIG. 7 is a block diagram of another alternative embodiment of the invention in which an antenna and a variable attenuator have been combined in a common element that is shared by multiple receivers.

Referring now to FIG. 7, yet another alternative embodiment of the invention is shown. This embodiment is very much like the one shown in FIG. 5. The difference between the two embodiments is that, in FIG. 7, the variable attenuator has been replaced by the antenna/attenuator 702, which is an antenna having adjustable antenna gain, such as an electronically adjustable phased array antenna. The remaining elements in FIG. 7 operate the same as the corresponding elements described above with respect to FIG. 5, and need not be described in further detail.

The advantage of incorporating the adjustable attenuation directly in the antenna element is that intermodulation (IM) products generated in the antenna itself are attenuated by an amount that is approximately equal to the set attenuation raised to the $n^{th}$ power, where n is the order of the intermodulation product. This makes it possible to implement a receiver/antenna configuration having an extreme robustness against radio environments having the kinds of disturbances discussed above, including high signal strength (causing blocking), and intermodulation products. In addition, by designing a receiver which can compensate for high signal strength and intermodulation products, system margins can be widened to improve performance in the presences of other types of disturbances, such as cochannel interference and propagation channel distortion.

The invention has been described with reference to several specific embodiments. It will be recognized by those skilled in the art, however, that the invention may be practiced in ways not illustrated here. Thus, the scope of the invention is not limited by this description, but is, instead, defined by the following claims.

What is claimed is:

1. An apparatus for use in a communications system having a receiver that receives a communications signal transmitted by a transmitter, the transmitter including transmitter power control means, responsive to a received power control signal, for controlling a power level at which the transmitter transmits the transmitted communications signal, the apparatus comprising:

measurement means for generating a signal strength measurement signal based on the received communications signal;

means for attenuating the received communications signal by an attenuation amount dynamically determined by a control signal, thereby producing an attenuated signal to be supplied as an input to the receiver;

attenuation control means, coupled to the measurement means and the attenuating means, for using the signal strength measurement signal to generate the control signal and for supplying the control signal to the attenuating means; and     first power control means, coupled to the measurement means, for using the signal strength measurement signal to generate the power control signal to be communicated to the transmitter;

wherein the attenuation control means and the first power control means coordinate with one another to dynamically control, respectively, the attenuation amount and the transmitter power level so as to substantially optimize communications system performance, and     wherein the attenuation control means dynamically adjusts the attenuation amount to produce an effective dynamic range for receiving only signals having a signal strength level that is higher than a signal strength level of a disturbance signal, while at the same time the first power control means adjusts the transmitter power level so that the transmitter will produce an adjusted communications signal that is within the effective dynamic range of the receiver.

2. An apparatus according to claim 1, wherein the attenuation control means and the first power control means adjust, respectively, the attenuation amount and the transmitter power level in response to a bit error rate of the received communications signal being higher than a predetermined amount, the higher bit error rate indicating the presence of the disturbance signal.

3. An apparatus according to claim 1, wherein the attenuating means includes an antenna having a dynamically adjustable antenna gain.

4. An apparatus according to claim 1, wherein the attenuation control means and the first power control means cooperate to simultaneously and dynamically control, respectively, the attenuation amount and the transmitter power level so as to substantially optimize communications system performance.

5. An apparatus for use in a communications system having a plurality of receivers coupled to a common antenna through a receiver multicoupler, wherein each receiver is in communication with a corresponding one of a plurality of transmitters, each of the transmitters including transmitter power control means for controlling a transmitter power level in response to a received one of a plurality of power control signals, the apparatus comprising:

front end attenuating means, coupled to the common antenna to receive a plurality of communications signals transmitted by the plurality of transmitters, for attenuating the plurality of communications signals by a front end attenuation amount dynamically determined by a first control signal, the front end attenuating means having an output for supplying the attenuated plurality of received communications signals to the receiver multicoupler;

a plurality of auxiliary devices, each comprising:

an input for receiving a corresponding one of the attenuated plurality of received communications signals from the receiver multicoupler;

first signal strength measurement means for generating, for the corresponding one of the plurality of attenuated communications signals, a first signal strength measurement signal; and         first power control means, coupled to the first signal strength measurement means, for using the first signal strength measurement signal to generate one of the plurality of power control signals to be communicated to the corresponding one of the plurality of transmitters; and     front end attenuation control means having an input coupled to receive the first signal strength measurement signal from each of the plurality of auxiliary devices and an output coupled to the front end attenuating means for using each of the first signal strength measurement signals to generate the first control signal and for supplying the first control signal to the front end attenuating means,     wherein the front end attenuation control means and the first power control means of each of the plurality of auxiliary devices dynamically control, respectively, the front end attenuation amount and the transmitter power level of each of the plurality of transmitters so as to substantially optimize communications system performance.

6. An apparatus according to claim 5, wherein the front end attenuation control means and the first power control means of each of the plurality of auxiliary devices dynamically control, respectively, the front end attenuation amount and the transmitter power level of each of the plurality of transmitters so as to keep the attenuated signal within a dynamic range of each of the plurality of receivers.

7. An apparatus according to claim 5, wherein the front end attenuation control means dynamically adjusts the receiver front end attenuation amount to produce, for each of the plurality of receivers, an effective dynamic range for receiving only signals having a signal strength level that is higher than a disturbance signal strength level, while at the same time the first power control means of each of the auxiliary devices dynamically controls the transmitter power level of the corresponding one of the plurality of transmitters so that the corresponding one of the plurality of transmitters will produce an adjusted communications signal that is within the effective dynamic range of a respective one of the receivers.

8. An apparatus according to claim 7, wherein the front end attenuation control means and the first power control means of each of the plurality of auxiliary devices control, respectively, the front end attenuation amount and the transmitter power level of each of the plurality of transmitters so as to substantially optimize communications system performance in response to a bit error rate of the received communications signals being higher than a predetermined amount, the higher bit error rate indicating the presence of a disturbance signal.

9. An apparatus according to claim 5, wherein the front end attenuating means includes an antenna having a dynamically adjustable antenna gain.

10. An apparatus according to claim 5, wherein the front end attenuation control means and the plurality of first power control means cooperate to simultaneously and dynamically control, respectively, the front end attenuation amount and the transmitter power level of the plurality of transmitters so as to substantially optimize communications system performance.

11. An apparatus for use in a communications system having a plurality of receivers coupled to a common antenna through a receiver multicoupler, wherein each receiver is in communication with a corresponding one of a plurality of transmitters, each of the transmitters including transmitter power control means for controlling a transmitter power level in response to a received one of a plurality of power control signals, the apparatus comprising:

front end attenuating means, coupled to the common antenna to receive a plurality of communications signals transmitted by the plurality of transmitters, for attenuating the plurality of communications signals by a front end attenuation amount dynamically determined by a first control signal, the front end attenuating means having an output for supplying the attenuated plurality of received communications signals to the receiver multicoupler;

a plurality of auxiliary devices, each comprising:
an input for receiving a corresponding one of the attenuated plurality of received communications signals from the receiver multicoupler;
second attenuating means for further attenuating the corresponding one of the attenuated plurality of received communications signals by a further attenuation amount dynamically determined by a corresponding second control signal, and outputting a further attenuated communications signal;
first signal strength measurement means for generating, for the further attenuated communications signal, a first signal strength measurement signal; and
first power control means, coupled to the first signal strength measurement means, for using the first signal strength measurement signal to generate one of the plurality of power control signals to be communicated to the corresponding one of the plurality of transmitters; and
second attenuation control means, having an input coupled to the first signal strength measurement means and an output coupled to the second attenuating means, for using the first signal strength measurement signal to generate the second control signal and for supplying the second control signal to the second attenuating means; and front end attenuation control means having an input coupled to receive the first signal strength measurement signal from each of the plurality of auxiliary devices and an output coupled to the front end attenuating means for supplying the first control signal to the front end attenuating means, wherein the front end attenuation control means, the first power control means of each of the plurality of auxiliary devices, and the second attenuation control means of each of the plurality of auxiliary devices dynamically control, respectively, the front end attenuation amount, the transmitter power level of each of the plurality of transmitters, and the further attenuation amount of the second attenuating means of each of the auxiliary devices so as to substantially optimize communications system performance.

12. An apparatus according to claim 11, wherein the front end attenuation control means, the first power control means of each of the plurality of auxiliary devices, and the second attenuation control means of each of the plurality of auxiliary devices dynamically control, respectively, the front end attenuation amount, the transmitter power level of each of the plurality of transmitters, and the further attenuation amount of the second attenuating means of each of the auxiliary devices so as to keep the further attenuated communications signal of each of the auxiliary devices within a dynamic range of a corresponding one of the plurality of receivers.

13. An apparatus according to claim 11, wherein the front end attenuation control means dynamically adjusts the receiver front end attenuation amount and the second attenuation control means of each of the auxiliary devices dynamically adjusts the further attenuation amount of the respective auxiliary device to produce, for each of the plurality of receivers, an effective dynamic range for receiving only signals having a signal strength level that is higher than a disturbance signal strength level, while at the same time the first power control means of each of the auxiliary devices dynamically controls the transmitter power level of the corresponding one of the plurality of transmitters so that the corresponding one of the plurality of transmitters will produce an adjusted communications signal that is within the effective dynamic range of a respective one of the receivers.

14. An apparatus according to claim 13, wherein the front end attenuation control means, the second attenuation control means of each of the plurality of auxiliary devices, and the first power control means of each of the plurality of auxiliary devices control, respectively, the front end attenuation amount, the further attenuation amount of the second attenuating means of each of the auxiliary devices, and the transmitter power level of each of the plurality of transmitters so as to substantially optimize communications system performance in response to a bit error rate of the received communications signals being higher than a predetermined amount, the higher bit error rate indicating the presence of a disturbance signal.

15. An apparatus according to claim 11, wherein the front end attenuating means comprises an antenna having a dynamically adjustable antenna gain.

16. An apparatus according to claim 11, wherein the front end attenuation control means, the first power control means of each of the plurality of auxiliary devices, and the second attenuation control means of each of the plurality of auxiliary devices cooperate to simultaneously and dynamically control, respectively, the front end attenuation amount, the transmitter power level of each of the plurality of transmitters, and the further attenuation amount of the attenuating means of each of the auxiliary devices so as to substantially optimize communications system performance.

17. In a communications system having a receiver that receives a communications signal transmitted by a transmitter, the transmitter including transmitter power control means responsive to a received power control signal for controlling a power level at which the transmitter transmits the communications signal, the receiver including attenuating means for attenuating the received communications signal by an amount dynamically determined by a control signal, a method of operating the communications system comprising the steps of:

measuring a signal strength of the received communications signal;

dynamically adjusting the attenuation amount, based on the measured signal strength; and generating the power control signal based on the measured signal strength, and transmitting the power control signal to the transmitter, wherein the steps of dynamically adjusting the attenuation amount and generating the power control signal are coordinated so as to substantially optimize communications system performance, and wherein the steps of dynamically adjusting the attenuation amount and generating the power control signal are further based on dynamically adjusting receiver attenuation to produce an effective dynamic range for receiving only signals having a signal strength level that is higher than a signal strength level of a disturbance signal, while at the same time adjusting transmitter power level so that it will produce an adjusted communications signal that is within the effective dynamic range of the receiver.

18. A method according to claim 17, wherein the steps of dynamically adjusting the attenuation amount and generating the power control signal are performed simultaneously in order to dynamically optimize communications system performance.

19. A method according to claim 17, wherein the steps of dynamically adjusting the attenuation amount and generating the power control signal are performed in response to a bit error rate of the received communications signal being higher than a predetermined amount, the higher bit error rate indicating the presence of the disturbance signal.

* * * * *